US012748403B2

(12) United States Patent
Aoi

(10) Patent No.: US 12,748,403 B2
(45) Date of Patent: Sep. 29, 2026

(54) STATE MANAGEMENT SYSTEM, STATE MANAGEMENT METHOD, AND STORAGE MEDIUM

(71) Applicant: Tokyo Electron Limited, Tokyo (JP)

(72) Inventor: Ryota Aoi, Hokkaido (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 397 days.

(21) Appl. No.: 18/118,582

(22) Filed: Mar. 7, 2023

(65) Prior Publication Data

US 2023/0288917 A1 Sep. 14, 2023

(30) Foreign Application Priority Data

Mar. 14, 2022 (JP) ................................ 2022-039414

(51) Int. Cl.
*G05B 19/418* (2006.01)
*G05B 23/02* (2006.01)

(52) U.S. Cl.
CPC ..... *G05B 19/4183* (2013.01); *G05B 23/0272* (2013.01); *G05B 2219/2602* (2013.01)

(58) Field of Classification Search
None
See application file for complete search history.

(56) References Cited

U.S. PATENT DOCUMENTS

2023/0322279 A1* 10/2023 Oishi ...................... B61K 9/08 702/184

FOREIGN PATENT DOCUMENTS

| | | | |
|---|---|---|---|
| JP | H05061507 | A | 3/1993 |
| JP | 2008112209 | A | 5/2008 |
| JP | 2009157673 | A | 7/2009 |
| JP | 2021018494 | A | 2/2021 |

* cited by examiner

*Primary Examiner* — Sean Shechtman
(74) *Attorney, Agent, or Firm* — Venjuris, P.C.

(57) ABSTRACT

A state management system includes an acquisition unit configured to acquire cumulative data, an execution unit configured to execute, in each cycle, a processing of calculating a specific index indicating a state of the apparatus using a plurality of types of data among the acquired data, and a display control unit configured to display time-series data indicating a time-series change in the calculated specific index. The processing executed by the execution unit includes at least one of calculating a first index indicating a degree of normality of the apparatus, calculating a second index indicating a rate at which the apparatus was in the operable state, and calculating a third index indicating productivity of the apparatus. The display control unit displays the time-series data having the first index, the second index, and/or the third index as the specific index.

8 Claims, 9 Drawing Sheets

STATE MANAGEMENT SYSTEM, STATE MANAGEMENT METHOD, AND STORAGE MEDIUM

CROSS-REFERENCE TO RELATED APPLICATIONS

The present application is based on and claims priority from Japanese Patent Application No. 2022-039414, filed on Mar. 14, 2022, with the Japan Patent Office, the disclosure of which is incorporated herein in its entirety by reference.

TECHNICAL FIELD

The present disclosure relates to a state management system, a state management method, and a storage medium.

BACKGROUND

Various apparatuses such as a substrate processing apparatus monitor the data during operation to detect an abnormality. Meanwhile, it is important to improve the productivity of the apparatus by reducing the number of situations in which the operation of the apparatus is stopped when the abnormality is detected. Therefore, for example, Japanese Patent Laid-Open Publication No. 2021-018494 proposes a measure in which an operator or the like identifies the state of an apparatus during operation and takes appropriate measures before an abnormality is detected.

SUMMARY

According to one aspect of the present disclosure, there is provided a state management system including an acquisition unit configured to acquire data accumulated in an apparatus, an execution unit configured to execute, in each predetermined cycle, a processing of calculating a specific index indicating a state of the apparatus using a plurality of types of data among the data acquired by the acquisition unit, and a display control unit configured to display time-series data indicating a time-series change in the specific index calculated by the execution unit. The execution unit executes a processing including at least one of calculating a first index indicating a degree of normality of the apparatus by combining a plurality of types of data selected in advance from among the data acquired by the acquisition unit, calculating a second index indicating a rate at which the apparatus was in the operable state, by indicating whether or not the apparatus has been in an operable state from among the data acquired by the acquisition unit, and calculating a third index indicating productivity of the apparatus by extracting data indicating a product produced by the apparatus from among the data acquired by the acquisition unit. The display control unit displays the time-series data having at least one of the first index, second index, and third index as the specific index.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
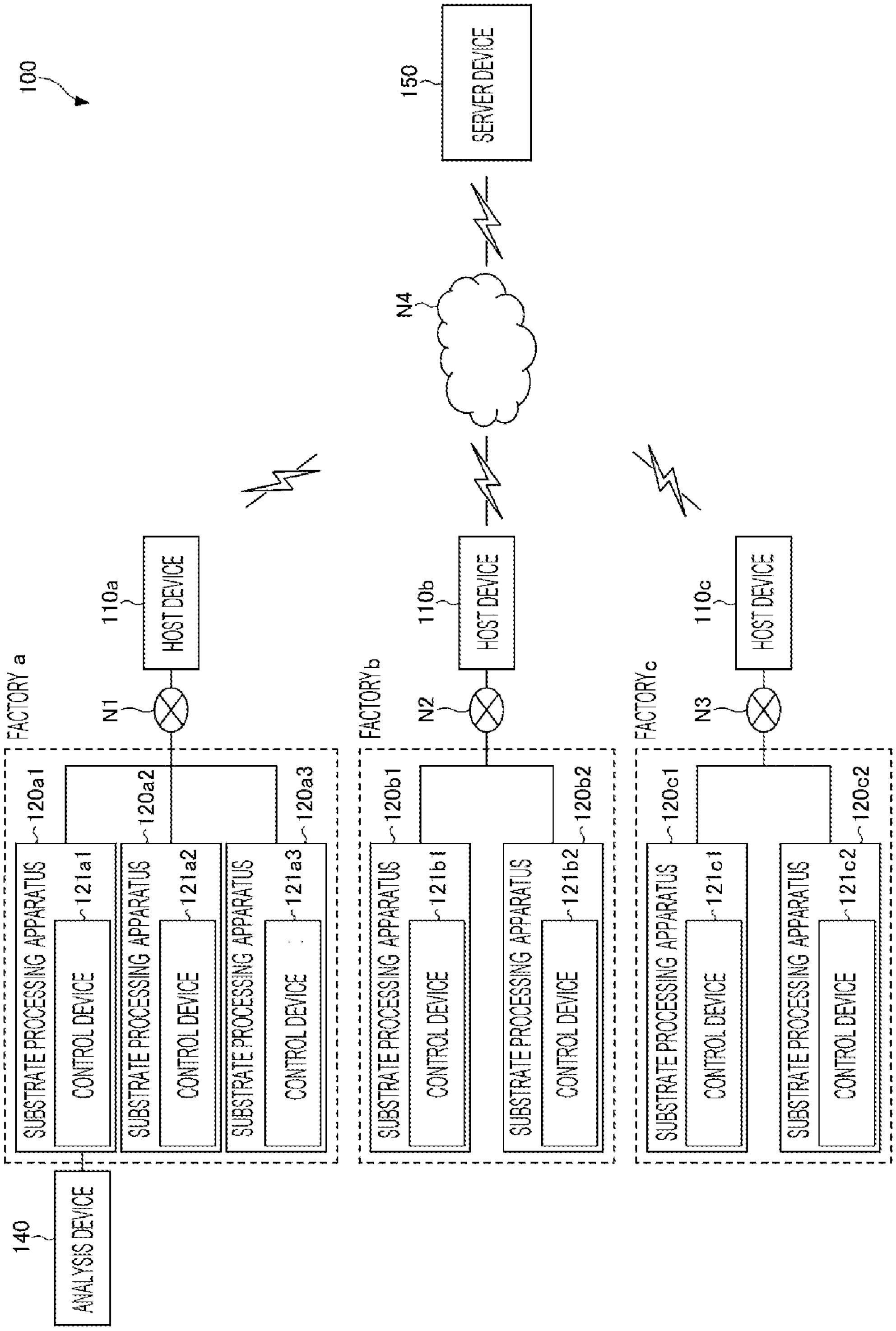
FIG. 1 is a diagram illustrating a configuration example of a state management system.

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

Hereinafter, embodiments for carrying out the present disclosure will be described with reference to the drawings. In each drawing, the same reference numerals may be given to the same components, and redundant descriptions may be omitted.

In this specification, orientations such as parallel, right angle, orthogonal, horizontal, vertical, up-and-down, and left-and-right are allowed to deviate to the extent that they do not impair the effects of embodiments. The shape of a corner is not limited to a right angle but may be rounded in arc shape. Parallel, right angle, orthogonal, horizontal, vertical, circular, and coincident may include substantially parallel, substantially right angle, substantially orthogonal, substantially horizontal, substantially vertical, substantially circular, and substantially coincident.

[State Management System]

Figure 2:
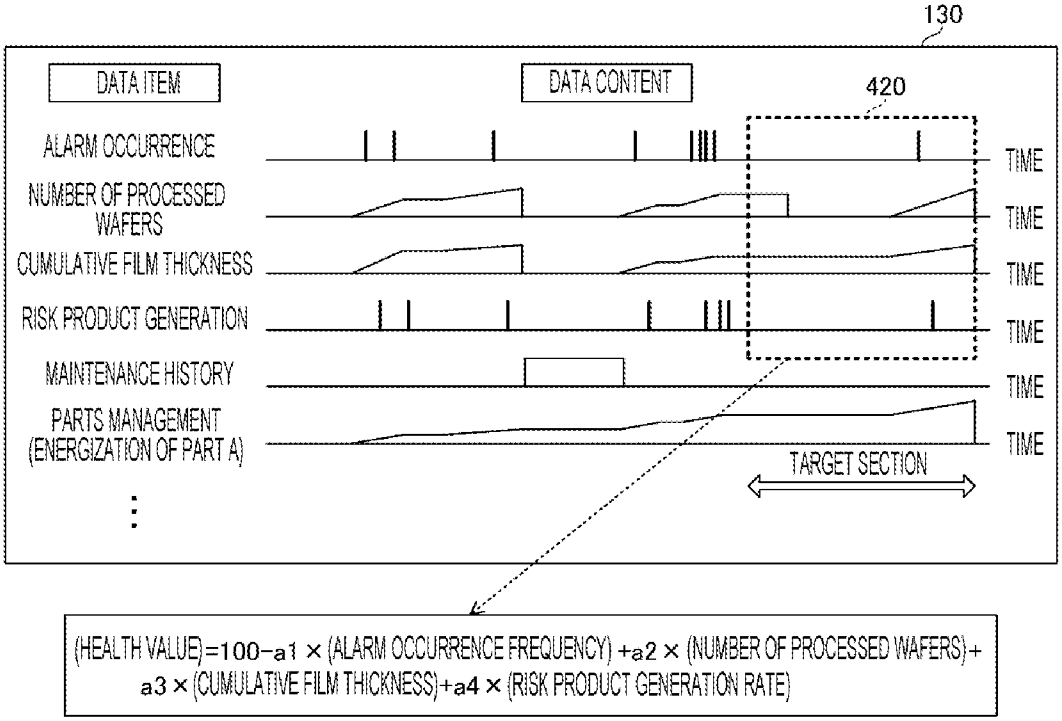
FIG. 2 is a diagram illustrating an example of data accumulated in a substrate processing apparatus.

First, a configuration example of a state management system according to an embodiment and an example of data accumulated in each substrate processing apparatus constituting the state management system will be described. FIG. 1 is a diagram illustrating a configuration example of a state management system. FIG. 2 is a diagram illustrating an example of data accumulated in a substrate processing apparatus.

As illustrated in FIG. 1, the state management system 100 includes substrate processing apparatuses 120*a*1 to 120*a*3 and control devices 121*a*1 to 121*a*3 in a factory a. The substrate processing apparatuses 120*a*1 to 120*a*3 and the control devices 121*a*1 to 121*a*3 are connected by wires or wirelessly.

Further, the state management system 100 includes substrate processing apparatuses 120*b*1 and 120*b*2 and control devices 121*b*1 and 121*b*2 in a factory b. The substrate processing apparatuses 120*b*1 and 120*b*2 and the control devices 121*b*1 and 121*b*2 are connected by wires or wirelessly.

Further, the state management system 100 includes substrate processing apparatuses 120*c*1 and 120*c*2 and control devices 121*c*1 and 121*c*2 in a factory c. The substrate processing apparatuses 120c1 and 120c2 and the control devices 121c1 and 121c2 are connected by wires or wirelessly.

The substrate processing apparatuses 120a1 to 120a3, the substrate processing apparatuses 120b1 and 120b2, and the substrate processing apparatuses 120c1 and 120c2 are connected to host devices 110a, 110b, and 110c via networks N1 to N3, respectively. Each substrate processing apparatus performs a substrate processing under the control of each control device based on instructions from the host devices 110a, 110b, and 110c. The host devices 110a, 110b, and 110c are connected to a server device 150 via a network N4 such as the Internet.

In the following description, the substrate processing apparatuses 120a1 to 120a3, 120b1 and 120b2, and 120c1 and 120c2 are collectively referred to as substrate processing apparatuses 120. Further, the control devices 121a1 to 121a3, 121b1 and 121b2, and 121c1 and 121c2 are collectively referred to as control devices 121. The host devices 110a, 110b, and 110c are collectively referred to as host devices 110.

It is assumed that the substrate processing apparatuses 120a1 to 120a3, the substrate processing apparatuses 120b1 and 120b2, and the substrate processing apparatuses 120c1 and 120c2 accumulate a wide variety of data managed by themselves in their own devices.

FIG. 2 illustrates cumulative data 130, which is an example of data managed by the substrate processing apparatus 120a1. As illustrated in FIG. 2, the cumulative data 130 includes data items and data content.

The example of FIG. 2 illustrates that the cumulative data includes, as the data items, each item of "alarm occurrence," "number of processed wafers," "cumulative film thickness," "RISK product generation," "maintenance history," "parts management (energization time of part A)." The data items included in the cumulative data 130 are not limited to these.

The analysis device 140 illustrated in FIG. 1 is connected to the substrate processing apparatuses 120 including the substrate processing apparatus 120a1, thereby continuously acquiring cumulative data accumulated in each of the substrate processing apparatuses 120. Although the example of FIG. 1 illustrates a state where the analysis device 140 is connected to the substrate processing apparatus 120a1, the disclosure is not limited to this. Hereinafter, in this embodiment, details of a case where the analysis device 140 is connected to the substrate processing apparatus 120a1 will be described.

When connected to the substrate processing apparatus 120a1, the analysis device 140 continuously acquires the cumulative data 130 from the substrate processing apparatus 120a1, and based on the acquired cumulative data 130, calculates a specific index indicating a state of the substrate processing apparatus 120a1 in each predetermined cycle and displays it to an operator. Specifically, the analysis device 140 calculates a "health value," "operation rate," and "production rate" of the substrate processing apparatus 120a1 as specific indices indicating the state of the substrate processing apparatus 120a1 and displays these indices to the operator.

The "health value" is one index indicating the degree of normality of the substrate processing apparatus 120a1 (first index). The analysis device 140 calculates the health value by combining data content of a pre-designated target section as data content corresponding to a plurality of types of data items (e.g., data items related to the occurrence of abnormalities) selected in advance among the acquired cumulative data 130. The first index is an example of the specific index indicating the state of the substrate processing apparatus calculated using a plurality of types of data among the acquired data.

In this way, the analysis device 140 calculates one index by combining data content corresponding to a plurality of types of data items in the cumulative data 130 and displays it to the operator. The analysis device 140 calculates the health value of the substrate processing apparatus 120a1 as one index and displays it to the operator.

The "operation rate" is one index indicating the rate at which the substrate processing apparatus 120a1 was in an operable state (second index). The analysis device 140 calculates the operation rate by extracting, from the cumulative data 130 acquired from the substrate processing apparatus 120a1, data content of a pre-designated target section as data content corresponding to a data item indicating whether or not the substrate processing apparatus 120a1 has been in the operable state. The second index is an example of the specific index.

In this way, the analysis device 140 calculates one index (second index) using data content corresponding to a data item indicating whether or not the substrate processing apparatus 120a1 was in the operate state and displays it to the operator. The analysis device 140 calculates the operation rate of the substrate processing apparatus 120a1 as one index and displays it to the operator.

Further, the "production rate" is one index indicating the number of substrates (product wafers) processed per hour, which are produced by the substrate processing apparatus 120a1 (third index). The analysis device 140 calculates the production rate by calculating, from the cumulative data 130 acquired from the substrate processing apparatus 120a1, the number of substrates (product wafers) processed per hour, which are produced by the substrate processing apparatus 120a1. The analysis device 140 calculates the production rate of the substrate processing apparatus 120a1 as one index and displays it to the operator. Thus, it is possible to reduce the operator's monitoring load, compared to a case where the operator monitors all of a wide variety of cumulative data accumulated in the substrate processing apparatus 120a1.

The operator may grasp the quality of the state of the substrate processing apparatus 120a1 at the time point from the "health value," the "operation rate," and the "production rate." However, in order to determine whether or not the state of the substrate processing apparatus 120a1 is always good, it is necessary to display and arrange data aggregated for each period, respectively, which is time-consuming. Therefore, there are provided the state management system 100 and a state management method which are capable of easily grasping a change in the state of the substrate processing apparatus 120 of the present disclosure.

[Hardware Configuration of Analysis Device]

Figure 3:
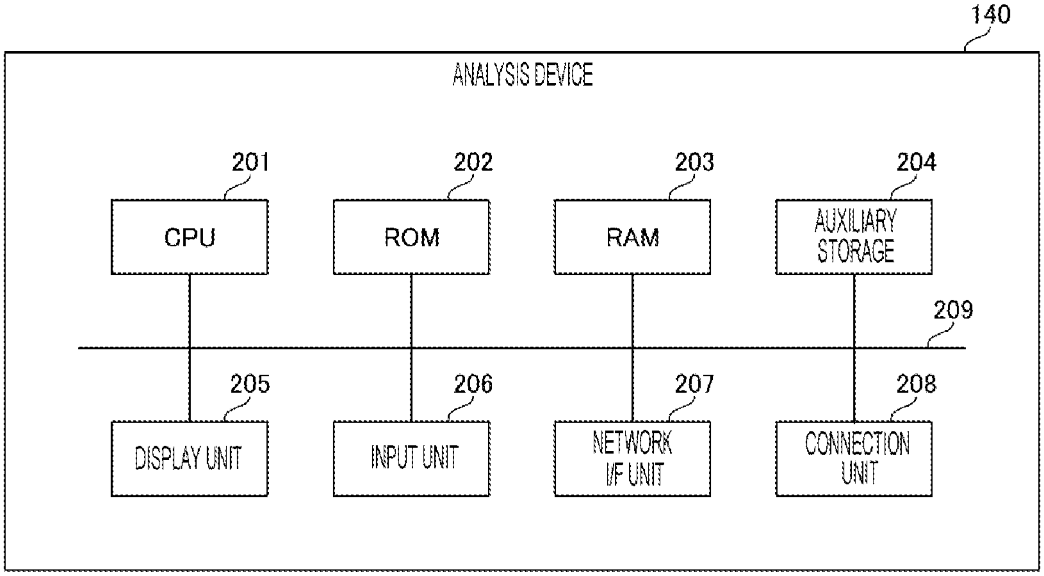
FIG. 3 is a diagram illustrating an example of a hardware configuration of an analysis device.

Next, a hardware configuration of the analysis device 140 will be described with reference to FIG. 3. FIG. 3 is a diagram illustrating an example of a hardware configuration of the analysis device 140. As illustrated in FIG. 3, the analysis device 140 includes a central processing unit (CPU) 201, a read only memory (ROM) 202, and a random access memory (RAM) 203. The CPU 201, the ROM 202, and the RAM 203 form a so-called computer.

Further, the analysis device 140 includes an auxiliary storage 204, a display unit 205, an input unit 206, a network interface (I/F) unit 207, and a connection unit 208. Each piece of hardware of the analysis device 140 is interconnected via a bus 209.

The CPU 201 is a device that executes various programs (e.g., an analysis program to be described later) installed in the auxiliary storage 204. The ROM 202 is a non-volatile memory. The ROM 202 functions as a main storage device that stores various programs and data necessary for the CPU 201 to execute various programs installed in the auxiliary storage 204. Specifically, the ROM 202 stores a boot program and the like, such as a basic input/output system (BIOS) or an extensible firmware interface (EFI).

The RAM 203 is a volatile memory such as a dynamic random access memory (DRAM) or a static random access memory (SRAM). The RAM 203 functions as a main storage device that provides a work area that is expanded when various programs installed in the auxiliary storage 204 are executed by the CPU 201.

The auxiliary storage 204 is an auxiliary storage device that stores various programs and information used when various programs are executed. A data storage to be described later is realized in the auxiliary storage 204.

The display unit 205 is a display device that displays various screens (e.g., a customization screen, a management screen, a detailed screen, and the like, which will be described later). The input unit 206 is an input device for the operator to input various instructions to the analysis device 140.

The network I/F unit 207 is a communication device connected to an external network (not illustrated). The connection unit 208 is a connection device connected to the substrate processing apparatus **120*a*1**.

[Functional Configuration of Analysis Device]

Figure 4:
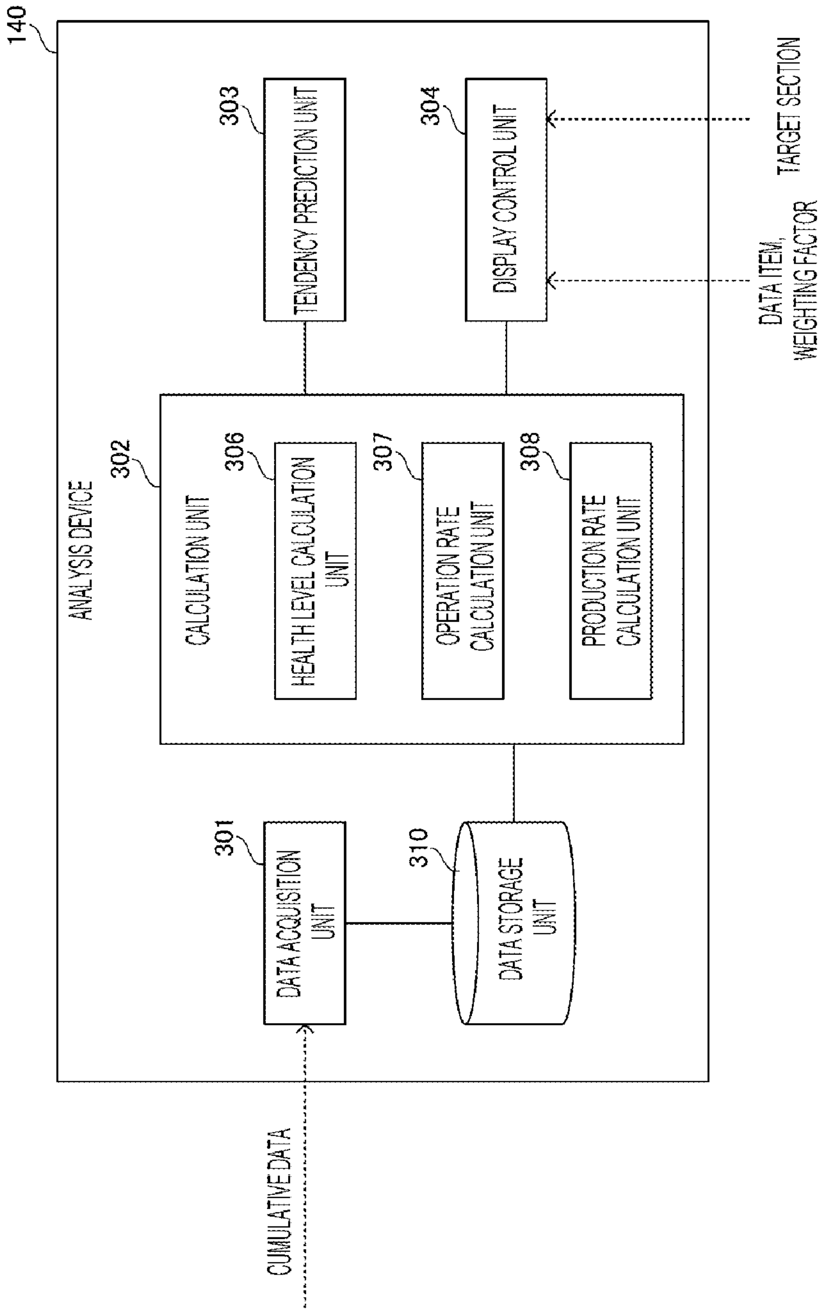
FIG. 4 is a diagram illustrating an example of a functional configuration of the analysis device.

Next, a functional configuration of the analysis device 140 will be described with reference to FIG. 4. FIG. 4 is a diagram illustrating an example of a functional configuration of the analysis device 140. As described above, the analysis program is installed in the analysis device 140, and by executing the analysis program, the analysis device 140 functions as a data acquisition unit 301, a calculation unit 302, a tendency prediction unit 303, and a display control unit 304.

The data acquisition unit 301 continuously acquires the cumulative data 130 accumulated by the substrate processing apparatus **120*a*1 as the analysis device 140 is connected to the substrate processing apparatus 120*a*1, and stores it in a data storage unit 310**.

The calculation unit 302 is an example of an execution unit that executes, in each predetermined cycle, a processing of calculating a specific index indicating the state of the substrate processing apparatus 120 using a plurality of types of data among the acquired data. The calculation unit 302 includes a health level calculation unit 306, an operation rate calculation unit 307, and a production rate calculation unit 308. The health level calculation unit 306 reads out, based on an instruction from the display control unit 304, data content of a pre-designated target section as data content corresponding to a data item selected in advance from the cumulative data stored in the data storage unit 310. Further, the health level calculation unit 306 calculates a "deduction value" of each data item by multiplying the read data content by a pre-designated weighting factor.

Further, the health level calculation unit 306 calculates the health value by subtracting the deduction value of each data item from a perfect score value (e.g., 100). Furthermore, the health level calculation unit 306 notifies the display control unit 304 of the calculated health value as a health level.

The operation rate calculation unit 307 reads out, based on an instruction from the display control unit 304, data content of a pre-designated target section as data content corresponding to a data item indicating whether or not the substrate processing apparatus was in the operable state from the cumulative data stored in the data storage unit 310.

Further, the operation rate calculation unit 307 calculates the length of time during which the substrate processing apparatus **120*a*1 was in the operable state based on the read data content. Furthermore, the operation rate calculation unit 307 calculates the rate of the calculated length of time, occupying the pre-designated target section, as an operation rate (%) and notifies the display control unit 304** of the operation rate.

The production rate calculation unit 308 calculates, based on the read data content, the number of substrates (product wafers) processed per hour (WPH: Wafer/hour) which are produced by the substrate processing apparatus **120*a*1. Furthermore, the production rate calculation unit 308 calculates a production rate (production capacity value) from the calculated number of product wafers processed per hour occupying the pre-designated target section, and notifies the display control unit 304** of the production rate.

The display control unit 304 receives the selection or designation of data items and weighting factors used to calculate the health value and notifies the health level calculation unit 306 of them. Further, the display control unit 304 receives the designation of target sections used to calculate the health value, the operation rate, and the production rate and notifies the health level calculation unit 306, the operation rate calculation unit 307, and the production rate calculation unit 308 of them.

Further, the display control unit 304 instructs the health level calculation unit 306, the operation rate calculation unit 307, and the production rate calculation unit 308 to calculate the health value, the operation rate, and the production rate in each predetermined cycle. Further, the display control unit 304 displays, on a management screen, the health value, the operation rate, and the production rate notified from the health level calculation unit 306, the operation rate calculation unit 307, and the production rate calculation unit 308 in response to the calculation instruction.

Further, the display control unit 304 displays time-series data indicating a time-series change of the calculated specific index. The calculated specific index is at least one of the health value, the operation rate, and the production rate. The display control unit 304 may display, as a graph, time-series data indicating time-series changes in the calculated health value, operation rate, and production rate.

Further, the display control unit 304 may display time-series data indicating time-series changes in the health value, the operation rate, and the production rate for each substrate processing apparatus 120. For example, the display control unit 304 may display time-series data of the health value, the operation rate, and the production rate related to the substrate processing apparatus **120*a*1 and time-series data of the health value, the operation rate, and the production rate of another substrate processing apparatus 120** side by side.

According to this, by displaying time-series changes in the state of the health value, the operation rate, and the production rate, the operator may easily grasp the time-series changes in the state of the health value, the operation rate, and the production rate. Further, by displaying time-series changes in the state of the health value, the operation rate, and the production rates for each apparatus, the operator may easily compare the time-series changes in the state of the health value, the operation rate, and the production rate between the substrate processing apparatuses 120.

The tendency prediction unit 303 analyzes a tendency of time-series changes in the health value, the operation rate, and the production rate based on time-series data of the calculated health value, operation rate, and production rate, and calculates predictive values of later (future) time-series changes in the health value, the operation rate, and the production rate.

The display control unit 304 displays the predictive values of time-series changes in the health value, the operation rate, and the production rate. The display control unit 304 may display, in time series, the time-series data of the calculated specific index and the predictive values of time-series changes in the calculated specific index.

Further, the display control unit 304 may convert a designated period and then, display time-series data of the health value, the operation rate, and the production rate. For example, when setting of the designated period is changed from one day to one week, the display control unit 304 may convert display from daily time-series data to weekly time-series data of the health value, the operation rate, and the production rate. Similarly, as for the predictive values, the display control unit 304 may convert a designated period and then, display the predictive values of time-series changes in the health value, the operation rate, and the production rate.

Specific Example of Health Value Calculation Processing

Next, a specific example of a health value calculation processing by the analysis device 140 will be described. When the analysis device 140 performs the health value calculation processing, the display control unit 304 first displays a selection screen on the display unit 205 and receives selection of data items used to calculate the health value. For example, a case where "number of processed wafers," "alarm occurrence frequency," "cumulative film thickness," and "RISK product generation rate" are selected as data items used to calculate the health value from among data items listed on the selection screen.

The selection screen includes a weighting factor designation field for designation of a weighting factor used to calculate the health value. The operator may designate a weighting factor of each data item by inputting the weighting factor into the weighting factor designation field and pressing a setting button each time the data item is selected.

Further, the selection screen also includes a target section designation field for designation of a target section used to calculate the health value. The operator may designate the target section used to calculate the health value by inputting the target section into the target section designation field and pressing the setting button.

In a case of the example of FIG. 2, the health level calculation unit 306 calculates the health value based on the following equation using data content of a target section surrounded by a dotted line 420 among the cumulative data 130.

$$\text{(Health value)} = 100 - a1\times(\text{number of processed wafers (substrates)}) - a2\times(\text{alarm occurrence frequency}) - a3\times(\text{cumulative film thickness}) - a4\times(\text{RISK product generation rate}) \quad \text{(Equation 1)}$$

In addition, "a1" to "a4" represent weighting factors designated for each selected data item. Further, "100" is a perfect score value, and a1×(number of processed wafers) represents a deduction value of the data item="number of processed wafers." Similarly, a2×(alarm occurrence frequency) represents a deduction value of the data item="alarm occurrence frequency," a3×(cumulative film thickness) represents a deduction value of the data item "cumulative film thickness," and a4×(RISK product generation rate) represents a deduction value of the data item "RISK product generation rate." However, it is assumed that the health level calculation unit 306 performs, for example, a normalization processing on data content corresponding to the selected data item when calculating the detection value.

[Health Value Calculation Processing]

Figure 5:
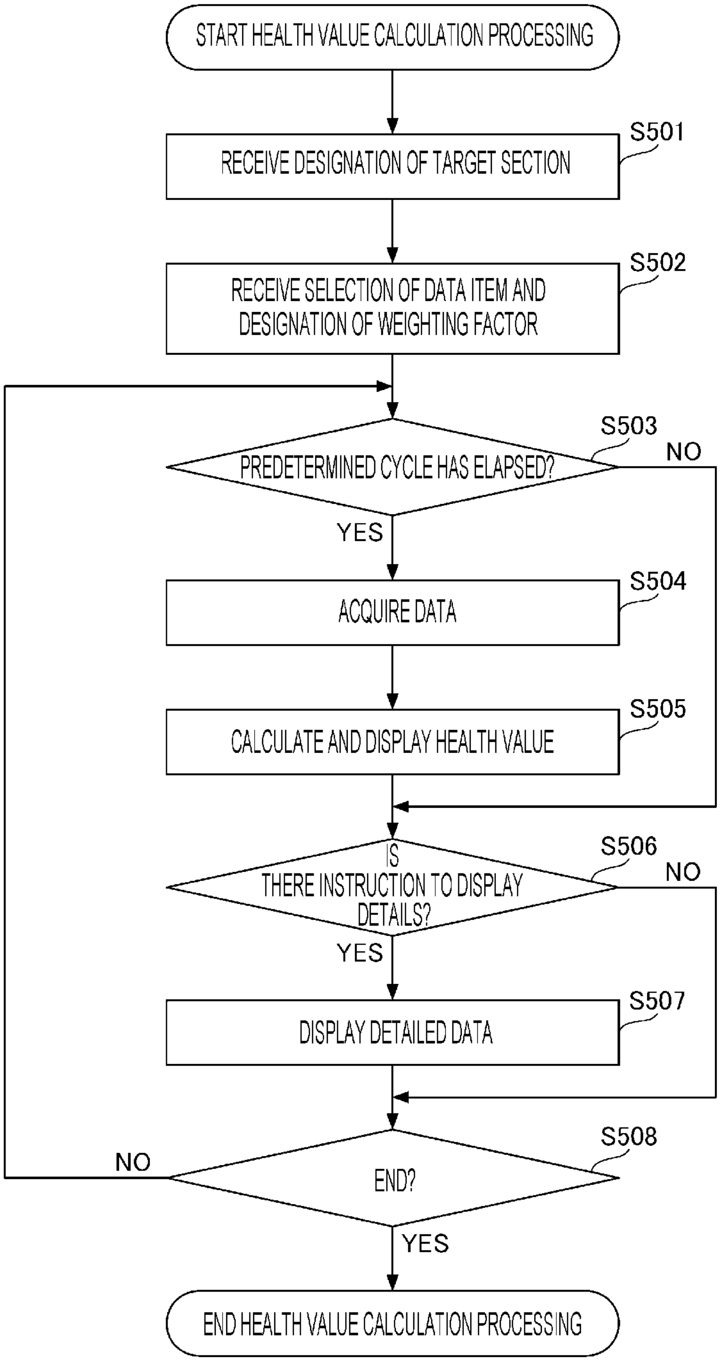
FIG. 5 is a flowchart illustrating a specific example of a health value calculation processing by the analysis device.

Next, a health value calculation processing by the analysis device 140 will be described with reference to FIG. 5. FIG. 5 is a flowchart illustrating the flow of a health value calculation processing by the analysis device 140. It is assumed that the data acquisition unit 301 continuously acquires the cumulative data 130 from the substrate processing apparatus 120*a*1 and stores it in the data storage unit 310 during the implementation of the health value calculation processing.

In step S501, the display control unit 304 displays the selection screen and receives designation of a target section. Further, the display control unit 304 notifies the health level calculation unit 306 of the received target section.

In step S502, the display control unit 304 receives selection of a data item on the selection screen, and receives designation of a weighting factor for the selected data item. Further, the display control unit 304 notifies the health level calculation unit 306 of the received data item and weighting factor.

In step S503, the display control unit 304 determines whether or not a predetermined cycle has elapsed. When it is determined in step S503 that the predetermined cycle has not elapsed ("NO" in step S503), the processing proceeds to step S506.

Meanwhile, when it is determined in step S503 that the predetermined period has elapsed ("YES" in step S503), the processing proceeds to step S504. In step S504, the display control unit 304 instructs the health level calculation unit 306 to calculate the health value. Further, the health level calculation unit 306 reads out data content of the notified target section from the data storage unit 310 as data content corresponding to the data item notified from the display control unit 304.

In step S505, the health level calculation unit 306 multiplies the read data content by the weighting factor notified from the display control unit 304, thereby calculating a deduction value of each selected data item. Further, the health level calculation unit 306 calculates the health value by subtracting the calculated deduction value from a perfect score value. Further, the display control unit 304 displays the health value calculated by the health level calculation unit 306 on the management screen, and also displays a health value calculated in the past on the management screen.

In step S506, the display control unit 304 determines whether or not an instruction to display details of the health value has been received. When it is determined in step S506 that the instruction to display details has not been received ("NO" in step S506), the processing proceeds to step S508.

Meanwhile, when it is determined in step S506 that the instruction to display details has been received ("YES" in step S506), the processing proceeds to step S507. In step S507, the display control unit 304 instructs the health level calculation unit 306 to notify data content corresponding to the data item for which the deduction value has been calculated. Further, the display control unit 304 displays, on the detailed screen, the data content corresponding to the data item for which the deduction value has been calculated, which is notified from the health level calculation unit 306 in response to the instruction.

In step S508, the display control unit 304 determines whether or not to end the health value calculation processing. When it is determined in step S508 that the health value calculation processing is to be continued ("NO" in step S508), the processing returns to step S503. Meanwhile, when it is determined in step S508 that the health value calculation processing is to be ended ("Yes" in step S508), the health value calculation processing is ended.

In this way, the analysis device 140 calculates the health value as an index indicating the present state of the substrate processing apparatus 120a1 in each predetermined cycle.

Specific Example of Operation Rate Calculation Processing

Figure 6:
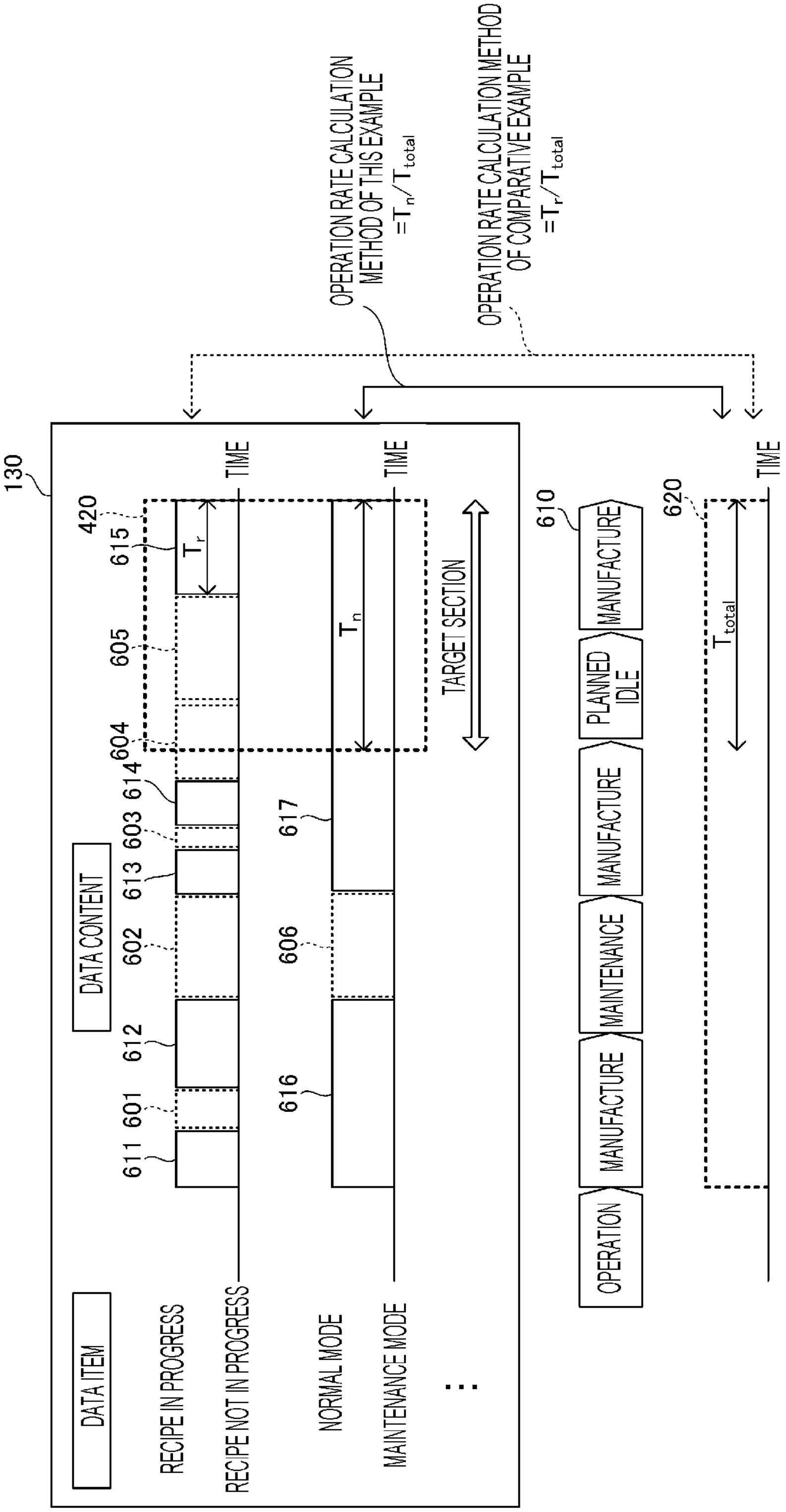
FIG. 6 is a diagram illustrating a specific example of an operation rate calculation processing by the analysis device.

Next, a specific example of an operation rate calculation processing by the analysis device 140 will be described. FIG. 6 is a diagram illustrating a specific example of an operation rate calculation processing. The operation rate calculation unit 307 of the analysis device 140 calculates the operation rate for a target section designated on the selection screen (the target section surrounded by the dotted line 420 in FIG. 2).

In FIG. 6, the cumulative data 130 is an example of data managed by the substrate processing apparatus 120a1 and here particularly indicates data related to the operation of the substrate processing apparatus 120a1. As illustrated in FIG. 6, the data related to the operation of the substrate processing apparatus 120a1 includes, for example, "recipe in progress/recipe not in progress" and "normal mode/maintenance mode" as data items.

Among these, the "recipe in progress/recipe not in progress" corresponds to data content indicating whether or not the substrate processing apparatus 120a1 was actually processing substrates based on a recipe (whether or not it was in operation). In FIG. 6, solid lines 611 to 615 represent that the substrate processing apparatus 120a1 was actually processing substrates based on the recipe (it was in operation). Meanwhile, in FIG. 6, dotted lines 601 to 605 represent that the substrate processing apparatus 120a1 was not processing substrates (it was not in operation). In a case of the example of FIG. 6, in the target section surrounded by the dotted line 420, the length of time during which the substrate processing apparatus 120a1 was actually processing substrates based on the recipe (the length of time during operation) is "$T_r$."

Among the dotted lines 601 to 605, the dotted lines 601, 603, and 604 represent a state (standby state) where the substrate processing apparatus 120a1 completes the processing of the target number of substrates and there are no substrates to be processed immediately in a manufacturing process. Further, the dotted line 602 represents a state where no substrate is being processed for the maintenance of the substrate processing apparatus 120a1. Furthermore, the dotted line 605 represents a state where no substrate is being processed because it corresponds to a planned idle section of the substrate processing apparatus 120a1. For example, the data acquisition unit 301 may acquire cumulative data except data during the maintenance represented by the dotted line 602.

Meanwhile, the "normal mode/maintenance mode" corresponds to data content indicating whether or not the substrate processing apparatus 120a1 was in a state where it could actually process substrates (whether it was in a state where it could operate). In FIG. 6, solid lines 616 and 617 are the normal mode, and represent that the substrate processing apparatus 120a1 was in a state where it could actually process substrates (it was in a state where it could operate). Meanwhile, a dotted line 606 is the maintenance mode, and represents that the substrate processing apparatus 120a1 was not in a state where it could actually process substrates (it was not in a state where it could operate). In a case of the example of FIG. 6, in the target section surrounded by the dotted line 420, the length of time during which the substrate processing apparatus 120a1 was in a state where it could actually process substrates (the length of time during which it was in a state where it could operate) is "$T_n$."

Here, reference numeral 610 in FIG. 6 represents the schedule of the substrate processing apparatus 120a1 at each time of the cumulative data 130. As can be seen from comparison with reference numeral 610, the length of time during which the substrate processing apparatus 120a1 actually processed substrates based on the recipe (the length of time during operation) also depends on the schedule of the substrate processing apparatus 120a1.

In other words, the length of time includes not only the time during which the substrate processing apparatus 120a1 is not processing substrates for own reasons thereof such as the maintenance of the substrate processing apparatus 120a1 or the occurrence of abnormalities during operation, but also the time during which the substrate processing apparatus 120a1 is not processing substrates due to the schedule such as a standby state or a planned idle state.

Meanwhile, when calculating the operation rate of the substrate processing apparatus 120a1, it is appropriate to include, in the time during operation, the time during which the substrate processing apparatus 120a1 was in a state where it could actually process substrates among the time during which the substrate processing apparatus 120a1 is not processing substrates. This is because the operator may appropriately grasp the past state of the substrate processing apparatus 120a1 by calculating the operation rate in this way.

In FIG. 6, "operation rate calculation method of a comparative example" illustrates how the operation rate of the target section surrounded by the dotted line 420 was calculated based on the data content corresponding to the "recipe in progress/recipe not in progress" of the cumulative data 130. According to the operation rate calculation method of the comparative example, the operation rate is $T_r/T_{total}$. In addition, "$T_{total}$" refers to the time included in the target section surrounded by the dotted line 420 within time 620 after starting up the substrate processing apparatus 120a1 ($T_{total}$ being equal to the target section except immediately after startup).

Meanwhile, in FIG. 6, "operation rate calculation method of this example" illustrates how the operation rate of the target section surrounded by the dotted line 420 was calculated based on the data content corresponding to the"normal mode/maintenance mode" of the cumulative data 130. According to the operation rate calculation method of this example, the operation rate is $T_n/T_{total}$.

In this way, in the present disclosure, the operation rate is calculated using data content corresponding to a data item that does not depend on the schedule of the substrate processing apparatus 120a1. The example of FIG. 6 illustrates a case where the "normal mode/maintenance mode" is used as a data item that does not depend on the schedule of the substrate processing apparatus 120a1. However, a data item other than the "normal mode/maintenance mode" may be used in the calculation of the operation rate of this example. The data item other than the "normal mode/maintenance mode" may be, for example, "online/offline" (not illustrated in FIG. 6).

In the cumulative data 130, the "online/offline" corresponds to data content indicating whether or not the substrate processing apparatus 120a1 was in a state where it was connected to the host device 110. In a case of online, it indicates that the substrate processing apparatus 120a1 was connected to the host device 110 (that is, it was in a state where it could actually process substrates). Meanwhile, in a case of offline, it indicates that the substrate processing apparatus **120*a*1 was not connected to the host device 110** (that is, it was not in a state where it could actually process substrates).

[Operation Rate Calculation Processing]

Figure 7:
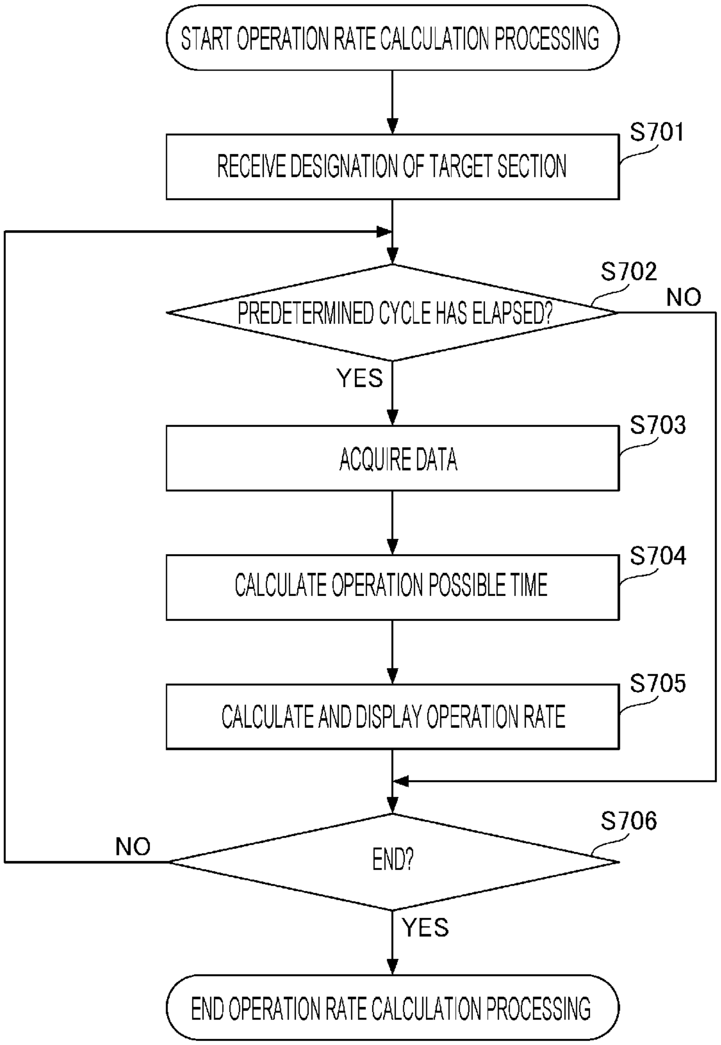
FIG. 7 is a flowchart illustrating the flow of the operation rate calculation processing by the analysis device.

Next, the flow of an operation rate calculation processing by the analysis device 140 will be described. FIG. 7 is a flowchart illustrating the flow of an operation rate calculation processing by the analysis device 140. It is assumed that the data acquisition unit 301 continuously acquires the cumulative data from the substrate processing apparatus **120*a*1 and stores it in the data storage unit 310** during execution of the operation rate calculation processing.

In step S701, the display control unit 304 notifies the operation rate calculation unit 307 of the target section received on the selection screen.

In step S702, the display control unit 304 determines whether or not a predetermined cycle has elapsed. When it is determined in step S702 that the predetermined cycle has not elapsed ("NO" in step S702), the processing proceeds to step S706.

Meanwhile, when it is determined in step S702 that the predetermined cycle has elapsed ("YES" in step S702), the processing proceeds to step S703. In step S703, the display control unit 304 instructs the operation rate calculation unit 307 to calculate the operation rate. Further, the operation rate calculation unit 307 reads out, from the data storage unit 310, data content of the target section notified from the display control unit 304 as data content corresponding to a data item indicating whether or not the substrate processing apparatus **120*a*1** was in a state where it could process substrates.

In step S704, the operation rate calculation unit 307 calculates the length of time during which the substrate processing apparatus **120*a*1** was in a state where it could process substrates based on the read data content.

In step S705, the operation rate calculation unit 307 calculates, as the operation rate, the rate of the length of time, during which the substrate processing apparatus **120*a*1 was in a state where it could process substrates, occupying the target section. Further, the display control unit 304 displays the calculated operation rate from the operation rate calculation unit 307** on the management screen, and also displays an operation rate calculated in the past on the management screen.

In step S706, the display control unit 304 determines whether or not to end the operation rate calculation processing. When it is determined in step S706 that the operation rate calculation processing is to be continued ("NO" in step S706), the processing returns to step S702. Meanwhile, when it is determined in step S706 that the operation rate calculation processing is to be ended ("YES" in step S706), the operation rate calculation processing is ended.

In this way, the analysis device 140 calculates the operation rate as an index indicating the past state of the substrate processing apparatus **120*a*1** in each predetermined cycle.

[Production Rate Calculation Processing]

Figure 8:
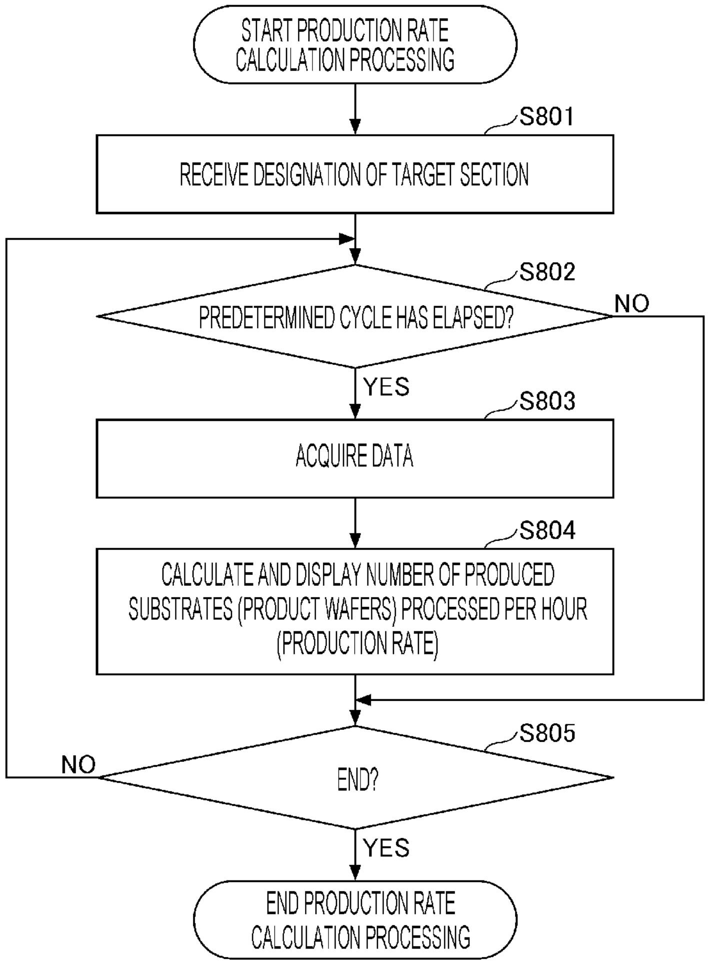
FIG. 8 is a flowchart illustrating the flow of a production rate calculation processing by the analysis device.

Next, the flow of a production rate calculation processing by the analysis device 140 will be described. FIG. 8 is a flowchart illustrating the flow of a production rate calculation processing by the analysis device 140. It is assumed that the data acquisition unit 301 continuously acquires the cumulative data from the substrate processing apparatus **120*a*1 and stores it in the data storage unit 310** during the implementation of the production rate calculation processing.

In step S801, the display control unit 304 notifies the production rate calculation unit 308 of the target section received on the selection screen.

In step S802, the display control unit 304 determines whether or not a predetermined cycle has elapsed. When it is determined in step S802 that the predetermined cycle has not elapsed ("NO" in step S802), the processing proceeds to step S805.

Meanwhile, when it is determined in step S802 that the predetermined cycle has elapsed ("YES" in step S802), the processing proceeds to step S803. In step S803, the display control unit 304 instructs the production rate calculation unit 308 to calculate the production rate. Further, the production rate calculation unit 308 reads out, from the data storage unit 310, data content of the target section notified from the display control unit 304 as data content corresponding to a data item indicating the number of processed substrates (product wafers) and the processing time.

In step S804, the production rate calculation unit 308 calculates the number of produced substrates (product wafers) processed per hour as the production rate based on the read data content. Further, the display control unit 304 displays the production rate calculated from the production rate calculation unit 308 on the management screen, and also displays a production rate calculated in the past on the management screen.

In step S805, the display control unit 304 determines whether or not to end the production rate calculation processing. When it is determined in step S805 that the production rate calculation processing is to be continued ("NO" in step S805), the processing returns to step S802. Meanwhile, when it is determined in step S805 that the production rate calculation processing is to be ended ("YES" in step S805), the production rate calculation processing is ended.

In this way, the analysis device 140 calculates the production rate as an index indicating the past state of the substrate processing apparatus **120*a*1** in each predetermined cycle.

[Time-Series Change Display Processing]

Figure 9:
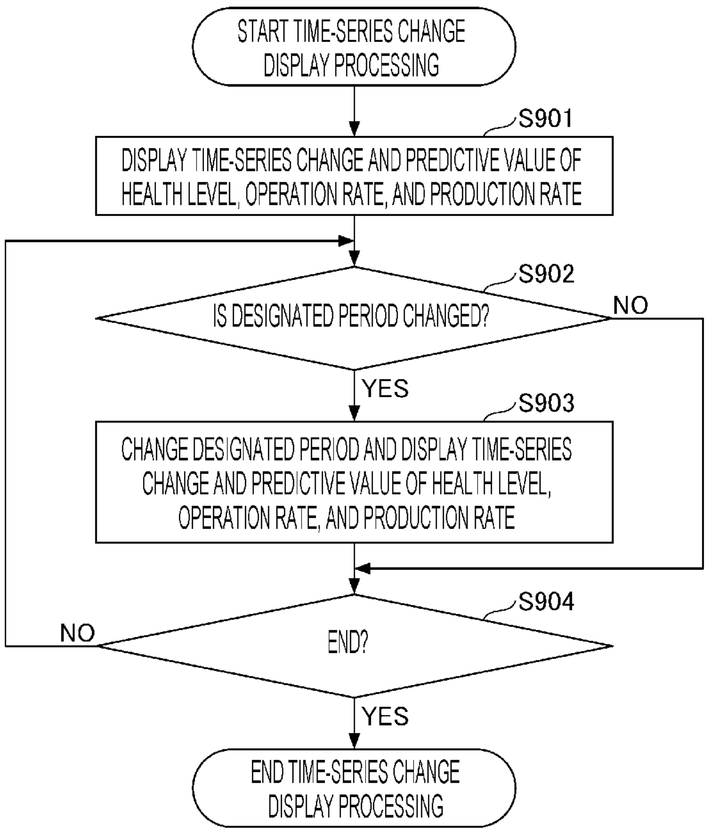
FIG. 9 is a flowchart illustrating the flow of a time-series change display processing.

Next, the flow of a time-series change display processing will be described. FIG. 9 is a flowchart illustrating the flow of a time-series change display processing. For example, when the operator presses a display button 501 (see FIG. 10A) on the screen, the processing of FIG. 9 is started. In this processing, the calculated health level (FIG. 5), operation rate (FIG. 7), and production rate (FIG. 8) are used.

In step S901, the display control unit 304 displays time-series data and predictive values indicating time-series changes in the calculated health level, operation rate, and production rate for an initially set period or for a period designated by the operator or the like. For example, when the initially set period or the designated period is one day, time-series data of the health level, the operation rate, and the production rate for each day are displayed.

In step S902, the display control unit 304 determines whether the designated period has been changed. When it is determined that the designated period has not been changed ("NO" in step S902), the processing proceeds to step S904. When it is determined that the designated period has been changed ("Yes" in step S902), the display control unit 304 changes the designated period in step S903 to obtain and display time-series data and predictive values of the calculated health level, operation rate, and production rate. For example, when the set period is changed from one week to one month, time-series data of the health level, the operation rate, and the production rate for each month are displayed.

In step S904, the display control unit 304 determines whether or not to end the display of the time-series data of the health level, the operation rate, and the production rate. When the display control unit 304 determines not to end the display of the time-series data of the health level, the operation rate, and the production rate, the processing returns to step S902 to continue the processing after step S902. When the display control unit 304 determines to end the display of the time-series data of the health level, the operation rate, and the production rate by the operator's button operation or the like, this processing is ended.

Display Example of Management Screen and Time-Series Change Display Screen

Figure 10A:
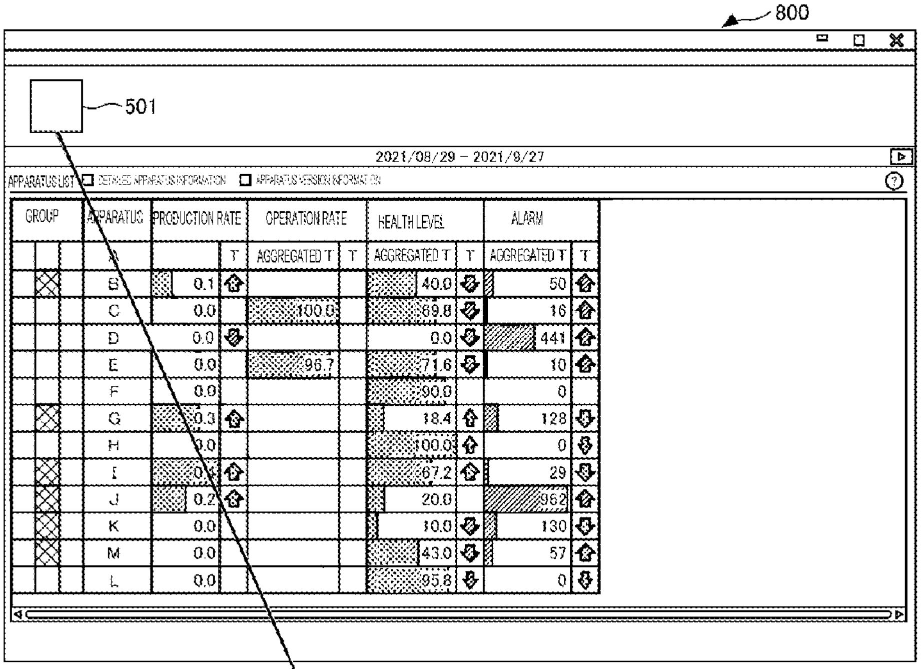
FIGS. 10A and 10B are an example of a management screen and a time-series change display screen.
Figure 10B:
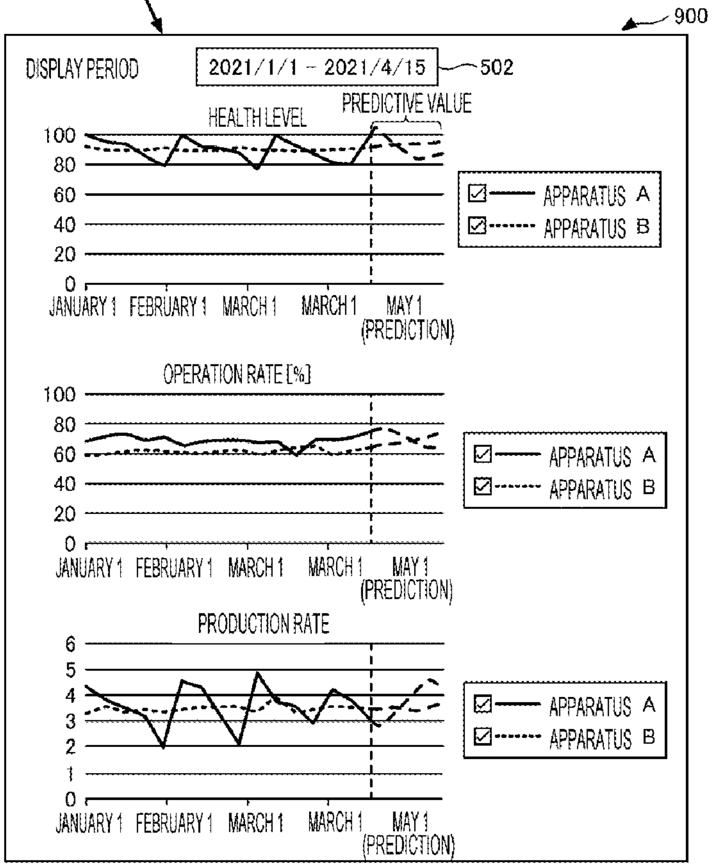

Next, a display example of a management screen and a time-series change display screen displayed on the display unit 205 of the analysis device 140 by the display control unit 304 will be described. FIGS. 10A and 10B are diagrams illustrating an example of a management screen and a time-series change display screen displayed on the display unit 205 of the analysis device 140.

FIG. 10A illustrates the production rate, operation rate, health level, alarm (number of times), and the like of each of substrate processing apparatuses A, B, C, D . . . L. As illustrated in FIG. 10A, a management screen 800 displays, in parallel, calculated result values of the health value, the operation rate, and the production rate when a target section is "the last month." Further, the management screen 800 displays transition of the past health value, transition of the past operation rate, and transition of the past production rate. This allows the operator to grasp the present state and past state of the substrate processing apparatus 120*a*1 and transitions thereof at a glance.

Further, as illustrated in FIG. 10A, when the operator designates the display button 501 on the management screen 800, a management screen 900 is displayed on the display unit 205 of the analysis device 140 to display time-series data of the health level, the operation rate, and the production rate as graphs, as illustrated in FIG. 10B. In FIG. 10B, time-series changes in the health value, the operation rate, and the production rate for each of the apparatus A (e.g., the substrate processing apparatus 120*a*1) and the apparatus B (e.g., the substrate processing apparatus 120*a*2) may be visually checked. Thus, the operator may easily grasp a change in the state of each substrate processing apparatus 120 and may grasp the quality of the state of each apparatus and the periodicity or tendency of the state. Further, future predictive values of time-series changes in the health level, the operation rate, and the production rate of each apparatus may be displayed.

By displaying the predictive values of time-series changes in the health level, the operation rate, and the production rate, the past, present, and future tendencies of the health level, the operation rate, and the production rate for each apparatus may be grasped at a glance. For example, the operator may easily manage a production line since the prediction of production is possible from a time-series change in the production rate, such as the prediction of production is possible before and after maintenance.

Further, a next maintenance timing may be predicted from a time-series change in the operation rate. Therefore, the operator may predict an excess of or a decrease in production volume from a combination of time-series changes in the production rate and the operation rate and, after referring to data content, may determine whether or not to take a treatment (or what treatment to take). In the same way for the health level, the operator may appropriately manage the state of each apparatus based on at least one of or a combination of two or more of time-series changes in the health level, the operation rate, and the production rate.

Furthermore, in the present disclosure, time-series data of the health level, the operation rate, and the production rate are displayed at intervals for a designated period. For example, time-series data of the health level, the operation rate, and the production rate may be displayed in cycles such as every day, every week, and every month. In the example of FIG. 10B, in a period 502 from 2021/1/1 to 2021/4/15, when one month is designated as the designated period, time-series data of the health level, the operation rate, and the production rate may be displayed as graphs on a monthly cycle.

Further, when the operator changes the designated period, time-series data of the health level, the operation rate, and the production rate may be converted and displayed with respect to a newly designated period. This allows the operator to simply display a rough state change (e.g., a monthly change) and a detailed state change (e.g., a daily change) of the apparatus according to a designated period. Thus, it is possible to appropriately grasp the cycle and tendency of the state of each apparatus.

The data acquired by the data acquisition unit 301 from the cumulative data 130 may exclude apparently irregular data, such as when the apparatus has not been operated for several months due to long-term maintenance. Further, each of the apparatuses A, B, C, D . . . may be divided into a plurality of groups, and time-series changes in the health level, the operation rate, and the production rate of a plurality of apparatuses in each group may be displayed separately or collectively.

As described above, according to a state management system, a state management method, and a program of the present embodiment, it is possible to easily grasp a change in the state of an apparatus.

The state management system 100 in FIG. 1 is given by way of example, and it goes without saying that there are various system configuration examples depending on the use and purpose thereof. The division of devices such as the substrate processing apparatus 120, the control device 121, the host device 110, and the server device 150 in FIG. 1 is given by way of example. For example, the number of substrate processing apparatuses 120, the number of control devices 121, the number of factories, the number of host devices 110, and the like in FIG. 1 are given by way of example and are not limited thereto.

For example, the state management system 100 may have various configurations, such as a configuration in which at least two of the substrate processing apparatus 120, the control device 121, the host device 110, and the server device 150 are integrated, or a configuration in which they are further divided. For example, the control device 121 may collectively control a plurality of substrate processing apparatuses 120, may be provided in the substrate processing apparatus 120 in a one to one ratio, or may be integrated with the substrate processing apparatus 120.

Further, an example in which the analysis device 140 is connected to the substrate processing apparatus 120*a*1 has been given, but the analysis device 140 may be connected to another substrate processing apparatus 120 as well.

Further, a program for executing the state management method of the present disclosure may be installed in the analysis device 140 or may be read into the analysis device 140 from a storage medium storing the program. Thus, the analysis device 140 may automatically execute the health value calculation processing (FIG. 5), the operation rate calculation processing (FIG. 7), the production rate calculation processing (FIG. 8), and the time-series change display processing (FIG. 9).

The analysis device 140 may be realized by the host device 110, or may be realized by the server device 150. In this case, the analysis device 140 becomes unnecessary. Further, the analysis device 140 may be realized by the control device 121. The analysis device 140 may be realized by a control device (not illustrated) that collectively controls a plurality of control devices 121.

The substrate processing apparatus of the present disclosure may be applied to any type of apparatuses such as atomic layer deposition (ALD), capacitively coupled plasma (CCP), inductively coupled plasma (ICP), radial line slot antenna (RLSA), electron cyclotron resonance plasma (ECR), and helicon wave plasma (HWP) apparatuses.

The substrate processing apparatus of the present disclosure may be applied to any of a single wafer apparatus for processing substrates one by one, and a batch apparatus and a semi-batch apparatus for collectively processing a plurality of substrates. Processings performed by the substrate processing apparatus of the present disclosure may include, for example, a film formation processing, an etching processing, and the like.

The substrate processing apparatus disclosed in this specification is not limited to an apparatus for processing a substrate using plasma, but may be an apparatus for processing a substrate without using plasma.

According to one aspect, it is possible to easily grasp a change in the state of an apparatus.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A network of a plurality of substrate processing apparatuses including a state management system, the state management system comprising:

an acquisition circuitry configured to continuously acquire data accumulated in each of the plurality of substrate processing apparatuses in real time during operation of the plurality of substrate processing apparatuses;

an execution circuitry configured to execute, in each predetermined cycle during the operation, a processing of calculating a specific index indicating a state of each substrate processing apparatus of the plurality of substrate processing apparatuses using a plurality of types of data among the data acquired by the acquisition circuitry, wherein the execution circuitry includes a health level calculation unit, an operation rate calculation unit, and a production rate calculation unit;

a display control circuitry configured to display time-series data indicating a time-series change in the specific index calculated by the execution circuitry for each substrate processing apparatus of the plurality of substrate processing apparatuses; and a prediction circuitry configured to calculate a predictive value of a time-series change in the specific index in a future for each substrate processing apparatus of the plurality of substrate processing apparatuses, based on the time-series data of the specific index calculated by the execution circuitry, wherein the processing executed by the execution circuitry includes:

calculating a first index indicating a degree of normality of each substrate processing apparatus by combining a plurality of types of data selected in advance from among the data acquired by the acquisition circuitry;

calculating a second index indicating a rate at which each substrate processing apparatus was in the operable state, by extracting data indicating whether or not each substrate processing apparatus has been in an operable state from among the data acquired by the acquisition circuitry; and calculating a third index indicating productivity of each substrate processing apparatus by extracting data indicating a product produced by the substrate processing apparatus from among the data acquired by the acquisition circuitry, and wherein the display control circuitry displays the time-series data having at least one of the first index, second index, and third index as the specific index, and wherein the time-series data having at least one of the first index, second index, and third index as the specific index is used by the state management system to control the plurality of substate processing apparatuses.

2. The network of a plurality of substrate processing apparatuses according to claim 1, wherein the execution circuitry of the state management systems executes the processing on data of a predetermined target section among the data acquired by the acquisition circuitry.

3. The network of a plurality of substrate processing apparatuses according to claim 1, wherein the display control circuitry of the state management system displays the predictive value of the time-series change in the specific index.

4. The network of a plurality of substrate processing apparatuses according to claim 3, wherein the display control circuitry of the state management system displays, in time series, the time-series data of the specific index calculated by the execution circuitry and the predictive value of the time-series change in the specific index calculated by the prediction circuitry.

5. The network of a plurality of substrate processing apparatuses according to claim 4, wherein the display control circuitry of the state management system converts time-series data indicating the time-series change for a designated period to time-series data indicating the time-series change for a period newly set each time setting of the designated period is changed, and displays the converted time-series data.

6. The network of a plurality of substrate processing apparatuses according to claim 1, wherein the display control circuitry of the state management system displays, for each of a plurality of apparatuses, the time-series changes in the specific index calculated for each of the plurality of apparatuses.

7. A state management method comprising:

continuously acquiring data accumulated in each of a plurality of substrate processing apparatuses in real time during operation of the plurality of substrate processing apparatus, wherein the plurality of substrate processing apparatuses are connected via a network;

executing, in each predetermined cycle during the operation, a processing of calculating a specific index indicating a state of each substrate processing apparatus of the plurality of substrate processing apparatuses using a plurality of types of data among the data acquired in the acquiring, wherein the executing includes calculating the specific index using a health level calculation unit, an operation rate calculation unit, and a production rate calculation unit;

displaying time-series data indicating a time-series change in the specific index calculated in the executing for each substrate processing apparatus of the plurality of substrate processing apparatuses; and calculating a predictive value of a time-series change in the specific index in a future for each substrate processing apparatus of the plurality of substrate processing apparatuses, based on the time-series data of the specific index, wherein the processing in the executing includes:

calculating a first index indicating a degree of normality of each substrate processing apparatus by combining a plurality of types of data selected in advance from among the acquired data;

calculating a second index indicating a rate at which each substrate processing apparatus was in the operable state, by extracting data indicating whether or not each substrate processing apparatus has been in an operable state from among the acquired data; and calculating a third index indicating productivity of each substrate processing apparatus by extracting data indicating a product produced by the substrate processing apparatus from among the acquired data, and wherein the displaying the time-series data includes a processing of displaying the time-series data having at least one of the first index, second index, and third index as the specific index, and utilizing the time-series data having at least one of the first index, second index, and third index as the specific index to control the plurality of substate processing apparatuses.

8. A non-transitory computer-readable storage medium having stored therein a program that causes a computer to execute a process including:

continuously acquiring data accumulated in each of a plurality of substrate processing apparatuses in real time during operation of the plurality of substrate processing apparatuses, wherein the plurality of substrate processing apparatuses are connected via a network;

executing, in each predetermined cycle during the operation, a processing of calculating a specific index indicating a state of each substrate processing apparatus of the plurality of substrate processing apparatuses using a plurality of types of data among the data acquired in the acquiring, wherein the executing includes calculating the specific index using a health level calculation unit, an operation rate calculation unit, and a production rate calculation unit;

displaying time-series data indicating a time-series change in the specific index calculated in the executing for each substrate processing apparatus of the plurality of substrate processing apparatuses; and calculating a predictive value of a time-series change in the specific index in a future for each substrate processing apparatus of the plurality of substrate processing apparatuses, based on the time-series data of the specific index, wherein the processing in the executing includes:

calculating a first index indicating a degree of normality of each substrate processing apparatus by combining a plurality of types of data selected in advance from among the acquired data;

calculating a second index indicating a rate at which each substrate processing apparatus was in the operable state, by extracting data indicating whether or not the substrate processing apparatus has been in an operable state from among the acquired data; and calculating a third index indicating productivity of each substrate processing apparatus by extracting data indicating a product produced by the substrate processing apparatus from among the acquired data, and wherein the displaying the time-series data includes a processing of displaying the time-series data having at least one of the first index, second index, and third index as the specific index, and utilizing the time-series data having at least one of the first index, second index, and third index as the specific index to control the plurality of substate processing apparatuses.

* * * * *